(No Model.)
J. ROUSSAT.
CYCLE WHEEL.
No. 501,166. Patented July 11, 1893.
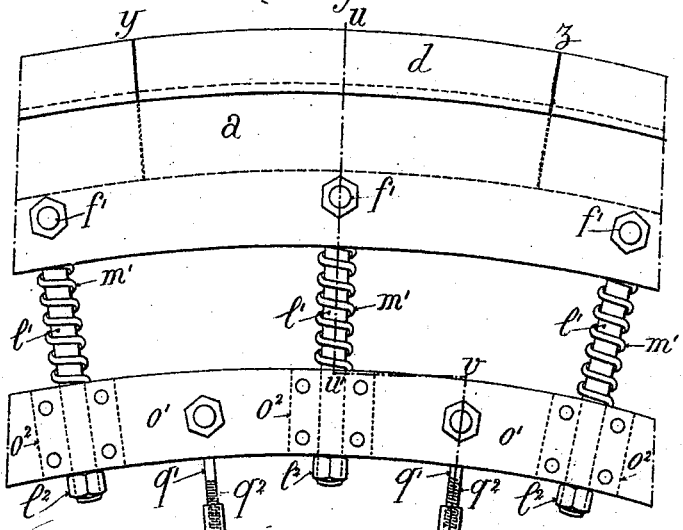
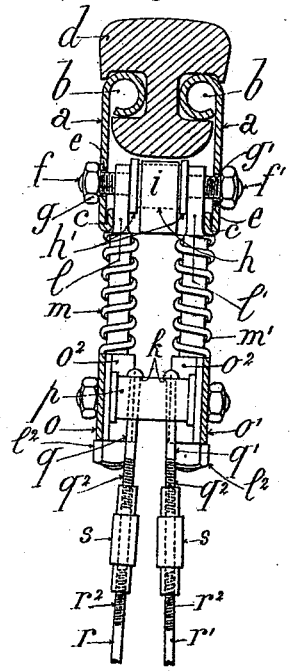
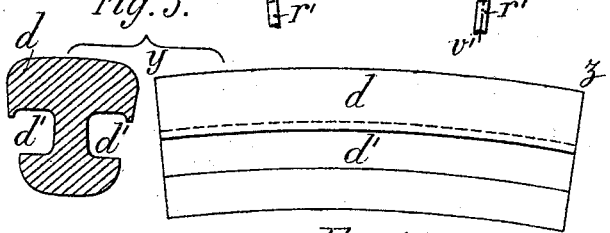
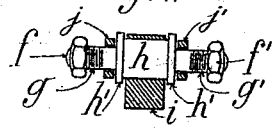
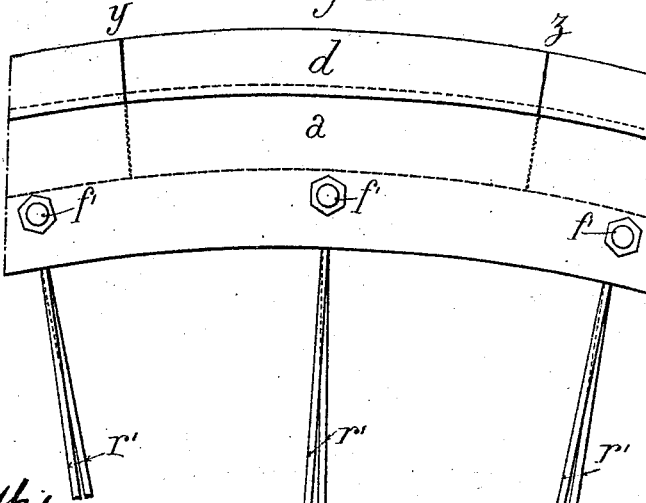
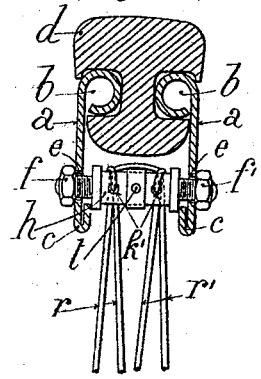
Witnesses:
H. K. Boulter
O. G. Northup
Inventor:
Jules Roussat,
by his attorney Wm. E. Boulter

UNITED STATES PATENT OFFICE.

JULES ROUSSAT, OF PARIS, FRANCE.

CYCLE-WHEEL.

SPECIFICATION forming part of Letters Patent No. 501,166, dated July 11, 1893.

Application filed February 18, 1893. Serial No. 462,164. (No model.)

*To all whom it may concern:*

Be it known that I, JULES ROUSSAT, a citizen of the Republic of France, residing at Paris, France, have invented certain new and useful Improvements in Cycle and other Wheels, of which the following is a specification.

This invention relates to an improved construction of wheels for velocipedes or other vehicles and mainly consists in combining the following parts:—(*a*) two ribbed, equidistant, metal plates permanently retained opposite each other by a series of rods, which keep them apart and are capable at the same time of serving as stretching drums for the purpose of imparting the required tension to the flexible spokes of the wheel, which are preferably made of wire, or as hereinafter described, of cord, catgut or other material; (*b*) a tire or band in the shape of a double T (or an I) preferably constructed of a number of sections tightly gripped between the ribbed plates just mentioned, under the pressure of the rods; so that this band or tire, whether of the cushion or pneumatic type may be permanently fixed to the metal rim without any cement, and readily removed therefrom by simply loosening the whole or part of the rods which keep apart and stiffen the plates; (*c*) a series of spring controlled compressing rods which render the wheel more flexible and admit of smoother riding.

The invention will be best understood by reference to the accompanying drawings, in which—

Figure 1 is a side elevation of one portion or section of the rim of a cycle wheel constructed in accordance with my invention. Fig. 2 is a cross section of the rim of the same wheel on lines $u$ $u'$ and $v$ $v'$ Fig. 1. Fig. 2ª is a sectional detail view hereinafter referred to. Fig. 3 is a longitudinal elevation and a cross section of a part or section of the improved solid tire; the same tire may however be of the cushion or pneumatic type. Figs. 4 and 5 are respectively a longitudinal elevation and a cross-section of a modified arrangement answering the same purpose as that shown in Figs. 1 and 2.

The same letters of reference designate like parts in all figures.

The rim of this improved wheel consists of two metal plates $a$ provided above and below with rods $b$ and $c$ forming ribs. These plates are retained in the proper relative position to each other and at a suitable distance apart, throughout the circumference of the wheel, by means of rods $h$ (Fig. 2ª) equidistantly arranged within the perforations $e$ provided in the two plates $a$ which form the metal rim of the wheel.

The tire $d$ which may be either solid or hollow, is inserted between the two plates $a$ and accommodates the ribs $b$ by means of the groove $d'$ and owing to its double T shape it is permanently retained in position by moving the plates $a$ closer to each other, for which purpose the rods $h$ may be tightened more or less as required. It is preferably formed of sections $y$ and $z$ of suitable length, whereby repairs and substitution of new sections are facilitated. The rods which keep the plates apart form part of a central cylindrical piece $h$ provided if necessary with two perforations and inclosed within collars or rings $h'$. Outside of these rings the cylindrical portions $g$ $g'$ are so threaded that the screw threads of $g$ and $g'$ run in opposite directions. Upon the threaded parts $g$ $g'$, passing through the plates $a$, which form the rim of the wheel, are formed nuts $f$ and $f'$ which press upon the rim outside of the plates $a$. Upon the rod $h$ are arranged rings $i$, $j$ and $j'$ forming fittings.

Between the ring $h'$ and the internal portion of each plate $a$ there may be fitted upon the rod $h$ another depending rod $l$ partly enveloped in a spiral spring. Another rod $l'$ is arranged symmetrically to $l$. Each of these rods $l$ and $l'$ is adapted to slide and is retained in position by a nut $l^2$ against an internal metal rim concentric with the plates $a$. This internal rim is formed of two flat or ribbed metal rings $o$ $o'$ against each of which is riveted internally, in a line with each of the rods $l$ $l'$ a sleeve or sheath $o^2$. These sleeves $o^2$ are riveted to the inside of the rim upon the rings $o$ $o'$, so as exactly to fit the cylindrical portion of each of the rods $l$ $l'$. Between the ribs $c$ of each plate $a$ and the metal ring $o$ or $o'$ is located a spiral spring $m$ $m'$ which therefore follows any bending or compression of the external rim $a$, being itself more or less compressed between the said rim $a$ and the coupled rings $o$ $o'$. The rings $o$ $o'$ are permanently kept apart by means of the rods $p$ similar to the rods $h$ arranged in the center of the arc extending between each pair of rods $l$ $l'$. The central portion $p$ of the said rods is perforated at $k$. Into each perforation $k$ of the rod $p$ is inserted a cylindrical rod $q$ the head of which rests upon the edges of the said perforation $k$ and whose depending stem $q^2$ is screw threaded. The metal spokes of this wheel are each formed of a pair of cylindrical or prismatic metal rods $r$ $r'$. The rods are secured to the hub of the wheel in the ordinary manner. The spokes $r$ $r'$ thus formed are threaded at their opposite end $r^2$. An internally threaded sleeve or nut $s$ connects the ends $q^2$ and $r^2$, threaded in opposite directions, of the rods $q$ $q'$ $r$ $r'$ by which connection the spokes of the wheel are completed. By turning the nut $s$ in the desired direction the two ends $q$ $r$ and $q'$ $r'$ of each spoke respectively may be moved closer together or farther apart and the spokes thereby thoroughly and reliably tightened and secured in place.

In the arrangement represented in Figs. 4 and 5 the spring-controlled rods $l$ $l'$ are dispensed with and only one rim formed of equidistant ribbed metal plates $a$. In this modification it is assumed that the spokes $r$ $r'$ consist of pieces of wire rope or cable of suitable resistance and flexibility or of catgut or other cord the strands $r$ $r'$ of which pass on one side through holes provided in the rim or are tied to suitable pins thereon and on the other side pass through holes $k'$ provided in the rods $h$. To stretch such cords it is only necessary to turn these rods $h$ within their recesses $e$ by pressing upon a lever inserted for the purpose into a hole $t$ formed in each of the rods $h$. The employment of flexible wire, cord or cables, or of cords of catgut or fibrous material are advantageous because in case of their accidentally breaking, they may be immediately replaced by any ordinary cord or string.

I claim—

1. In a velocipede or other wheel, the combination with two ribbed rings, and adjusting rods or bolts therefor, of two flat rings, and spring-controlled rods connecting the two sets of rings, as and for the purpose specified.

2. In a velocipede or other wheel, the combination with two ribbed rings, adjusting rods or bolts therefor, spring controlled radial rods and two flat rings, of rod-guiding sleeves mounted on the flat rings, as and for the purpose specified.

3. In a velocipede or other wheel, the combination with two flat rings, of rods or bolts connecting them and serving for the attachment of the spokes, substantially as and for the purpose specified.

4. In a velocipede or other wheel, the combination with two flat rings and connecting rods or bolts, of spokes each formed in two parts, and a right and left-handed screwed nut connecting said two parts, as and for the purpose specified.

5. In a velocipede or other wheel, the combination of a tire of substantially I-shaped section, two ribbed rings, connecting rods or bolts, spring-controlled sleeves for guiding them, two flat rings connected by rods or bolts, spokes each made in two parts, and a right and left-handed screwed nut connecting the parts of each spoke, as and for the purpose specified.

6. In a velocipede or other wheel, the combination of a tire of substantially I-shaped section, two ribbed rings and combined ring connecting and spoke tightening rods or bolts, as described.

7. In a velocipede or other wheel, the combination with the substantially I-shaped tire having a groove in each side, of circular plates or rings arranged upon each side of the tire and having at their outer end inwardly-projecting ribs engaging the grooves of the tire, and means for adjusting the said rings toward and from each other, as and for the purpose specified.

In testimony whereof I have hereto set my hand in the presence of the two subscribing witnesses.

JULES ROUSSAT.

Witnesses:
ALBERT MAULVAULT,
ROBT. M. HOOPER.